US008350670B2

(12) United States Patent
Kelly et al.

(10) Patent No.: US 8,350,670 B2
(45) Date of Patent: Jan. 8, 2013

(54) METHODS AND SYSTEMS FOR SECURE KEYLESS ENTRY FOR VEHICLE FLEET MANAGEMENT

(76) Inventors: Michael P. Kelly, Dunnellon, FL (US); Paul H. Kakemoto, Santa Fe, NM (US); Jorge C. Almirall, Acworth, GA (US)

(*) Notice: Subject to any disclaimer, the term of this patent is extended or adjusted under 35 U.S.C. 154(b) by 975 days.

(21) Appl. No.: 12/136,004

(22) Filed: Jun. 9, 2008

(65) Prior Publication Data
US 2009/0015373 A1 Jan. 15, 2009

Related U.S. Application Data

(60) Provisional application No. 60/949,354, filed on Jul. 12, 207.

(51) Int. Cl.
B60R 25/00 (2006.01)

(52) U.S. Cl. ............ 340/5.72; 340/426.16; 340/426.36

(58) Field of Classification Search ............ 340/1.1, 340/5.1, 5.2, 5.7, 5.72, 425.5, 426.1, 430, 340/426.11–426.23, 426.36
See application file for complete search history.

(56) References Cited

U.S. PATENT DOCUMENTS

| 4,891,650 | A | * | 1/1990 | Sheffer | 342/457 |
| 4,942,393 | A | | 7/1990 | Waraksa et al. | |
| 5,724,028 | A | | 3/1998 | Prokup | |
| 5,739,748 | A | * | 4/1998 | Flick | 340/426.15 |
| 6,225,889 | B1 | * | 5/2001 | Furuta et al. | 340/426.36 |
| 6,396,412 | B1 | | 5/2002 | Banas | |
| 6,505,780 | B1 | * | 1/2003 | Yassin et al. | 235/492 |
| 6,870,458 | B2 | * | 3/2005 | Caren | 340/5.22 |
| 6,898,489 | B1 | | 5/2005 | Hayes, Sr. | |
| 6,937,138 | B2 | * | 8/2005 | Underdahl | 340/5.64 |
| 7,173,517 | B2 | | 2/2007 | Kondo et al. | |
| 7,327,215 | B2 | * | 2/2008 | McCall et al. | 340/5.2 |
| 2002/0186144 | A1 | * | 12/2002 | Meunier | 340/825.28 |
| 2003/0182033 | A1 | * | 9/2003 | Underdahl et al. | 701/29 |
| 2004/0002894 | A1 | | 1/2004 | Kocher | |
| 2005/0012593 | A1 | | 1/2005 | Harrod et al. | |
| 2005/0088320 | A1 | | 4/2005 | Kovach | |
| 2005/0275511 | A1 | | 12/2005 | Luo et al. | |
| 2005/0285743 | A1 | | 12/2005 | Weber | |
| 2006/0043176 | A1 | | 3/2006 | Meyerhofer et al. | |
| 2006/0043179 | A1 | * | 3/2006 | Nycz et al. | 235/385 |
| 2006/0105721 | A1 | * | 5/2006 | Domes | 455/90.1 |
| 2006/0155430 | A1 | | 7/2006 | Burgess | |
| 2006/0255119 | A1 | | 11/2006 | Marchasin et al. | |
| 2006/0276204 | A1 | | 12/2006 | Simpson et al. | |

* cited by examiner

Primary Examiner — Brian Zimmerman
Assistant Examiner — James Yang
(74) Attorney, Agent, or Firm — Bradley D. Crose; Crose Law LLC

(57) ABSTRACT

The technology described herein provides a keyless entry system and associated method for fleet vehicle management. Secure keyless entry is provided to a user for a vehicle in the fleet vehicle management environment without the user having possession of a vehicle key or a vehicle key fob to gain entry to the vehicle. Additionally, in various embodiments, this technology provides a personalized, programmable access device carried by a user desiring access to a particular locked vehicle in a fleet vehicle management environment, an access control device configured to access electronically an on-board vehicle keyless entry system, and an access chip module electronically attached to the access control device and configured to activate the on-board vehicle keyless entry system and thereby unlock the particular locked vehicle. Furthermore, this technology provides a system with local management, reporting, audit trails, wireless connectivity to each access control device, and self-testing.

27 Claims, 5 Drawing Sheets

METHODS AND SYSTEMS FOR SECURE KEYLESS ENTRY FOR VEHICLE FLEET MANAGEMENT

CROSS-REFERENCE TO RELATED APPLICATION(S)

The present non-provisional patent application claims the benefit of priority of U.S. Provisional Patent Application No. 60/949,354, which is entitled "METHODS AND SYSTEMS FOR SECURE KEYLESS ENTRY FOR VEHICLE FLEET MANAGEMENT", which was filed on Jul. 12, 2007, and which is incorporated in full by reference herein.

FIELD OF THE INVENTION

The technology described herein relates generally to electronic keyless entry systems and methods. More specifically, the technology described herein relates to a keyless entry system for fleet vehicle management. Additionally, this technology relates to a system and method for providing secure keyless entry to a user for a vehicle in the fleet vehicle management environment without the user needing possession of a vehicle key or a vehicle key fob to gain entry to the vehicle.

BACKGROUND OF THE INVENTION

Operators of fleet vehicle organizations, such as automobile dealerships or car rental companies, maintain hundreds or thousands of vehicle keys for a parking lot full of locked vehicles which are regularly accessed. However, for purposes of security, the access to such vehicles must be regulated. Security, accessibility, ease of use, portability, reporting, and analysis are all significant factors to consider in the management of a fleet vehicle management environment. Systems known in the art designed to address these factors include vehicle key management systems. Such key management systems are based on the security and management of the actual keys to the vehicles under management.

Known systems include actual vehicle key control products such as Key Trac, Key Logix, Key Systems, 1 Micro, Morse Watchman, KEYper Systems, GE Supra, and Key-Where. Each of these known systems controls access, provides security, accumulates data collection, provides analysis, and provides reporting by controlling the actual vehicle keys. These systems are essentially key management systems.

A system is needed wherein secure keyless entry is provided to a user for a vehicle in the fleet vehicle management environment without the user needing possession of a vehicle key or a vehicle key fob to gain entry to the vehicle. The technology described herein provides such a system.

BRIEF SUMMARY OF THE INVENTION

In various exemplary embodiments, the technology described herein provides systems and methods for keyless entry system for fleet vehicle management. Secure keyless entry is provided to the user for a vehicle in the fleet vehicle management environment without the user needing possession of a vehicle key or a vehicle key fob to gain entry into the vehicle. Other comparable uses are also contemplated herein, as will be obvious to those of ordinary skill in the art.

In one exemplary embodiment, the technology provides an electronic keyless entry system for fleet vehicle management. The system includes an access device. The access device is a personalized, re-programmable access device carried by a user desiring access to a particular locked vehicle in a fleet vehicle management environment. The system also includes an access control device. The access control device is located in an automobile vehicle and is configured to access electronically an on-board vehicle keyless entry system. The access control device is reconfigurable for use in another vehicle. The access control device is further configured to detect an unauthorized access to a vehicle, and subsequently and wirelessly communicate the detection to a localized server configured to alert personnel via electronic means such as e-mail, SMS and phone alerts. The access control device further facilitates vehicle location information, wherein the vehicle location device provides the location of the access control unit to a central server, thereby providing the location of a vehicle with a large fleet of vehicles or providing the location of a misplaced or unused access control device. The access control device is constructed of a durable polymer material that is water, chemical, and extreme temperature resistant. The access control device includes a separate access chip module, which can be removed and replaced by another access chip module in order to access another vehicle. The access chip module is electronically attached to the access control device and is configured to activate the on-board vehicle keyless entry system and thereby unlock the particular locked vehicle. Optionally, the access chip module circuitry is integrated into the access control device. The system provides secure keyless entry to the user without the user having possession of a vehicle key or a vehicle key fob to gain entry to the vehicle.

The access control device includes a radio-frequency identification (RFID) card reader and a microprocessor. The access device is a radio-frequency identification (RFID) tag encased in a durable polymer material. Optionally, the access control device is a keypad and the access device is a keypad sequence entered into the keypad. Optionally, the access control device is a magnetic card swipe reader device and the access device is a magnetically encoded card. The access control device and the access device are both customized for a specific fleet vehicle management environment. The access chip module functionality is upgradeable through replacement of the module itself within the access control device or a software upgrade via flash memory card (such as CF, SD, PCMCIA, Smart Card, etc.) of the access chip module's Microprocessor program code. The access chip module uses wireless access technology supported by car manufacturers such as remote keyless entry (RKE) technology. Optionally, the access chip module is a remote keyless entry (RKE) application specific integrated circuit (ASIC).

The system also includes an access device configuration system configured to program and personalize the access device carried by the user desiring access to the particular locked vehicle in a fleet vehicle management environment and a computer readable medium encoded with programming for configuring the access device, the programming configured to assign the access device for the user and to authorize the usage of the access device. The system further includes access device time limits, wherein the access device is limited in use to within the boundaries of an adjustable, preset timed automatic relocking time period. The system also includes a master access device configured to provide access to all vehicles in the vehicle fleet management environment. The access device is reactivated each day in order to prevent unauthorized use of a lost or stolen access device. The system further includes a common power source configured to provide durable power to the access control device and the access chip module. The system further includes an operational self test indicator, wherein the operational self test indicator provides audio and/or visual indication that the keyless entry electronics are activated. The system also includes a localized server, the localized server configured to assign and reassign an access device and to calculate and prepare user access and vehicle access reporting. The system further includes a wireless communications transmitter and receiver located with and electronically coupled to the access control device and a wireless communications transmitter and receiver located with and electronically coupled to a localized server for vehicle fleet management. Optionally, the localized server communicates with a central server not on the premises via the internet or a satellite network in order to aggregate several localized servers' data.

The system further includes a computer readable medium encoded with programming configured to monitor activity communications, thereby providing an audit trail for fleet vehicle inventory and user access activities by a localized server. The programming is also configured to provide for routine functionality checks of each access control device by a localized server. The system further includes a localized server configured to wirelessly override an access control device and lock/unlock the vehicle without the access device being presented to the vehicle.

The system further includes an engine interrupt system, wherein the engine interrupt system is electronically coupled to the access control device and the engine interrupt system will disable the engine from being started when no authorized access device is presented to the access control device, thereby allowing a vehicle ignition key to be left in the ignition or within a local office.

In another exemplary embodiment, the technology provides a method for the remote, electronic keyless entry in fleet vehicle management. The method includes: configuring an access control device to correspond to an on-board remote keyless entry system (RKE) in a specific vehicle in a fleet vehicle management environment, placing the configured access control device with the specific vehicle, parking the vehicle in the fleet vehicle management environment with the configured access control device located on the vehicle, approaching the specific vehicle with an access device presumably for the specific vehicle, authenticating, by the access control device, whether a bearer of the approaching access device is, in fact, authorized to gain entry into the specific vehicle, triggering an access chip module, by the access control device, to activate the on-board remote keyless entry system (RKE) receptors in the specific vehicle and unlock the vehicle, and relocking the vehicle after a predetermined period of time due to access inactivity. Alternately, the access control device allows for the locking of the specific vehicle by means of the access device. Alternately, the local server could remotely issue a command to a specific access control device to secure the vehicle. Secure keyless entry is provided to the user for the vehicle in the fleet vehicle management environment without the user having possession of a vehicle key or a vehicle key fob to gain entry to the vehicle. The method further includes generating activity reports for user access and vehicle access.

Advantageously, this technology provides secure keyless entry to a user for a vehicle in the fleet vehicle management environment without the user having possession of a vehicle key or a vehicle key fob to gain entry to the vehicle. Additionally, this technology provides a system whereby fleet vehicle management is provided without the necessity of controlling the vehicle key itself, as required by systems known in the art. Furthermore, this technology assists the manager of large fleet of vehicles by providing activity reporting for both users and vehicles, audit trails, customized centralization, wireless connectivity to access control devices, inactivity timeouts and vehicle relocks, master access device, and vehicle location information.

There has thus been outlined, rather broadly, the features of this technology in order that the detailed description that follows may be better understood, and in order that the present contribution to the art may be better appreciated. There are additional features of the invention that will be described and which will form the subject matter of the claims. Additional aspects and advantages of this technology will be apparent from the following detailed description of an exemplary embodiment which is illustrated in the accompanying drawings. The technology described is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The technology described herein is illustrated with reference to the various drawings, in which like reference numbers denote like system components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various embodiments, the technology described herein provides systems and methods for a keyless entry system for fleet vehicle management. Secure keyless entry is provided to the user for a vehicle in the fleet vehicle management environment without the user needing possession of a vehicle key or a vehicle key fob to gain entry to the vehicle. Other comparable uses are also contemplated herein, as will be obvious to those of ordinary skill in the art.

Figure 1:
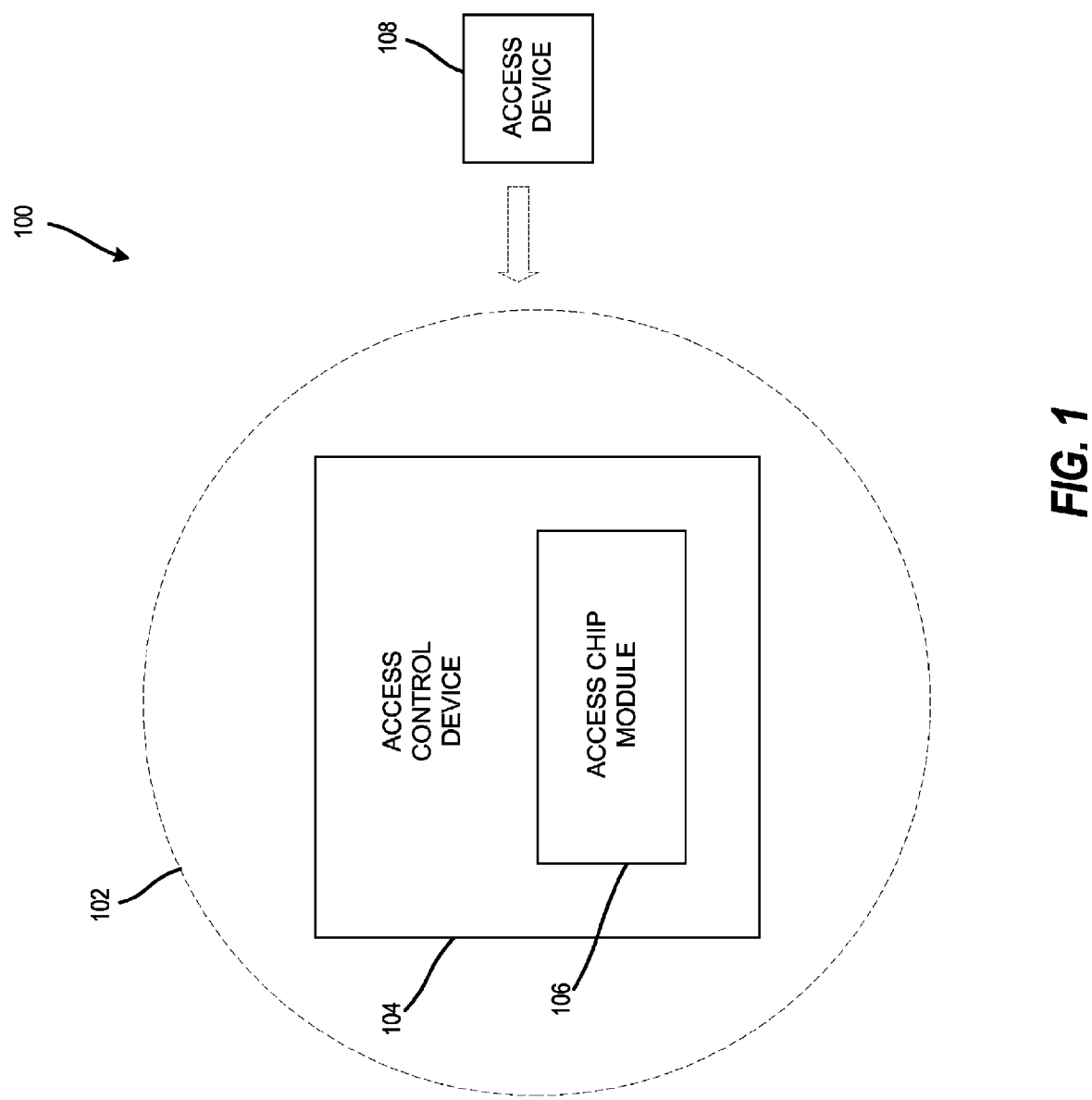
FIG. 1 is a schematic diagram illustrating an access control device for an automotive vehicle, according to an embodiment of this technology, and illustrating, in particular, the interaction of the access control device with both an access chip module and a user-carried access device.

Referring now to FIG. 1, a schematic diagram is shown, illustrating a keyless entry system 100 for fleet vehicle management. The system 100 provides secure keyless entry to the user without the user having possession of a vehicle key or a vehicle key fob to gain entry to the vehicle. The system 100 includes an access device 108. The access device 108 is a personalized and programmable access device carried by a user desiring access to a particular locked vehicle in a fleet vehicle management environment. The access device 108 is customized for a specific fleet vehicle management environment such as the parking lot of a rental car company or an automobile dealership. The access device 108 is reusable and reprogrammable, allowing subsequent users to use the same reconfigured access device 108. In the event an access device 108 is not returned by a user after use, the security of the system 100 is not breached since the authorized privileges of the access device 108 expire after a predetermined period of time. Thus a lost or stolen access device 108 does not present a security risk.

The system 100 also includes an access control device 104 for an automotive vehicle. The access control device 104 is located within the automobile vehicle and is configured to access electronically an on-board vehicle keyless entry system. The access control device 104 is customized for a specific fleet vehicle management environment. The access control device 104 is constructed of a durable polymer material that is water, chemical, and extreme temperature resistant. For example, the access control device 104 is manufactured with acrylonitrile butadiene styrene (ABS), or a similar durable material. The access control device 104 is rugged and suitable for multiple reuses in multiple vehicles. The access control device 104 is reconfigurable for use in another vehicle. Thus, the access control device 104 is neither permanently assigned to nor physically attached to one vehicle and is available for use repeatedly on a variety of vehicles, vehicle types, parking lot environments, etc. In an alternative embodiment, the access control device 104 is further configured to detect an unauthorized access to a vehicle and subsequently and wirelessly communicate the detection to a localized server configured to alert personnel via electronic means such as e-mail, SMS, and phone alerts.

In an alternative embodiment, the access control device 104 further facilitates vehicle location information, wherein the vehicle location device provides the location of the access control unit to a central server, thereby providing the location of a vehicle with a large fleet of vehicles or providing the location of a misplaced or unused access control device. The vehicle location system incorporates GPS, wireless triangulation, or related technology to provide the vehicle location information.

In one exemplary embodiment, the access control device 104 is a radio-frequency identification (RFID) card reader and the access device 108 is a radio-frequency identification (RFID) card. When the access control device 104 is an RFID card reader, the access control device detects an approaching RFID card access device 108 within the range 102. In this embodiment, it is not necessary for the access device 108 to actually touch the access control device 104 since the access device 108 need only be present within the range 102.

Alternatively, in another embodiment, the access control device 104 is a keypad and the access device 108 is a keypad sequence entered into the keypad. The keypad is, for example, but not limited to, an alpha-numeric entry keypad. As such, a user is given a code to serve as the access device 108. This code is entered into the entry keypad of the access control device 104. Thus, each vehicle entered into has a unique code access device 108.

In yet another alternative embodiment, the access control device 104 is a magnetic card swipe reader device and the access device 108 is a magnetic card. The magnetic card swipe reader operates like a credit card reader in a point-of-sale transaction. In this embodiment, the magnetic card reader access control device 108 is at least partially exterior to the vehicle. For example, the card reader access control device 104 is placed on the driver-side window such that the track of the card reader in which the swipe card access device 108 is slid is external to the vehicle. As a user approaches, the card access device 108 is slid through the card reader access control device 104, thereby activating the keyless entry system for the vehicle and subsequently unlocking the vehicle.

The system 100 further includes an access chip module 106. The access chip module 106 is electronically attached to the access control device 104 and is configured to activate the on-board vehicle keyless entry system and thereby unlock a specific locked vehicle that the user desires to enter. The access chip module 106 uses wireless access technology supported by car manufacturers such as remote keyless entry (RKE) technology. In an alternative embodiment, the access chip module 106 is a remote keyless entry (RKE) application specific integrated circuit (ASIC). Optionally, the access chip module circuitry is integrated into the access control device 104. The access chip module 106 is a separate printed circuit board (PCB) that is electronically connected and pluggable into the access control device 104.

In another embodiment, the system 100 further includes an engine interrupt system, wherein the engine interrupt system is electronically coupled to the access control device 104 and the engine interrupt system will disable the engine from starting when no authorized access device 108 is presented to the access control device 104, thereby allowing a vehicle ignition key to be left in the ignition or within a local office.

In another embodiment, the system 100 further includes an internal common power source for use with or without the battery of the vehicle. The common power source is configured to provide durable power to the access control device 104 and the access chip module 106. The common power source may provide power for a minimum of ten accesses to the vehicle for each of one hundred eighty consecutive days.

In another embodiment, the system 100 further includes an operational self test indicator, wherein the operational self test indicator provides audio and/or visual indication that the remote keyless entry (RKE) electronics are activated. For example, light emitting diodes (LEDs) and/or audio buzzers provide visual and/or audio indication that the remote keyless entry (RKE) electronics are activated and currently operational.

Figure 2:
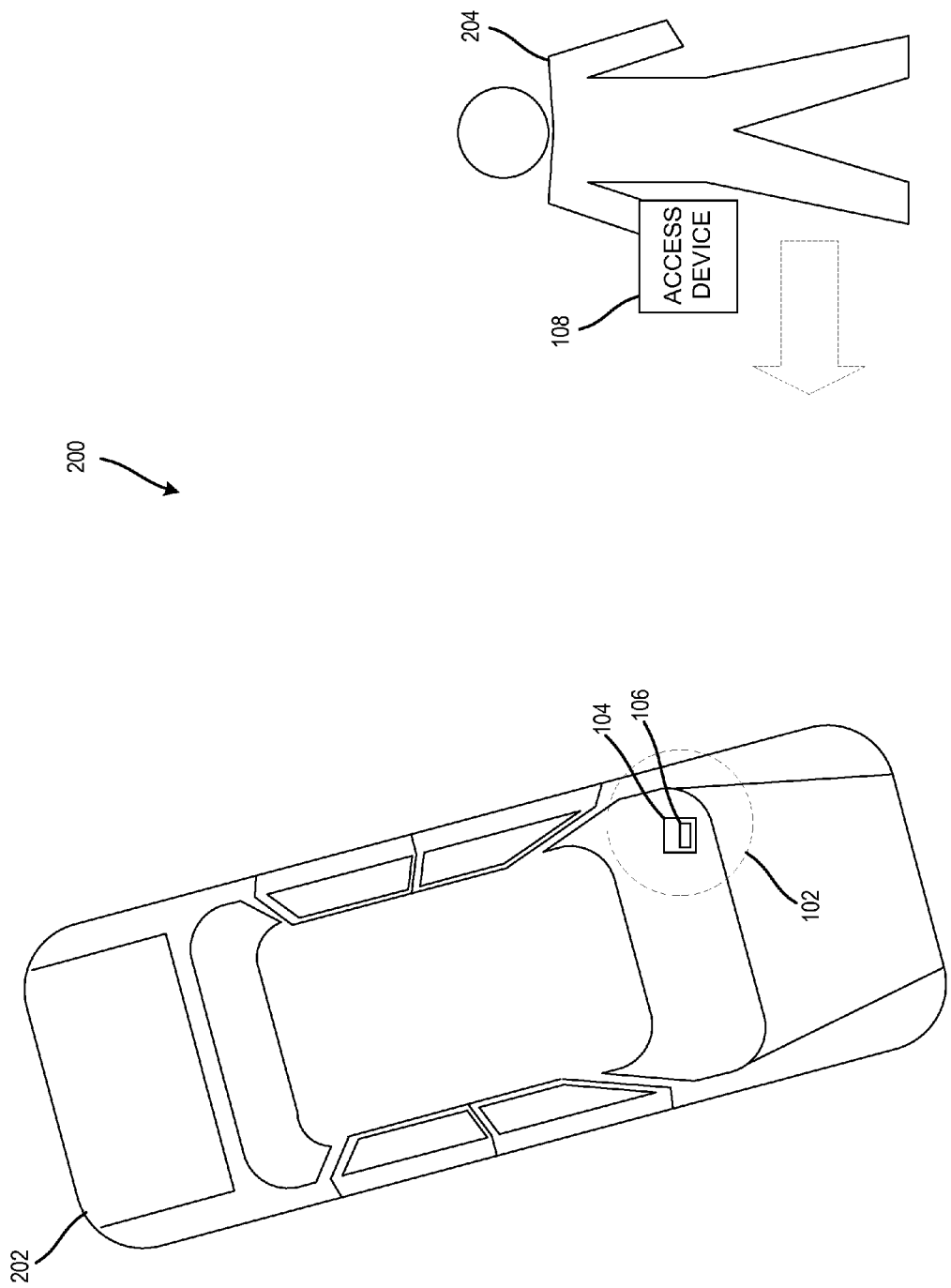
FIG. 2 is a schematic diagram illustrating the access control device for an automotive vehicle of FIG. 1, further illustrating the use of a preprogrammed access device by a person approaching a particular vehicle receptive to that preprogrammed access device in order to remotely and externally activate the vehicle on-board remote keyless entry system (RKE) and subsequently gain entry to the vehicle.

Referring now to FIG. 2, a schematic diagram 200 is shown, illustrating the access control device 104 for an automotive vehicle 202 in a fleet vehicle management environment. The access control device 104 is programmed to electronically communicate with an on-board keyless entry system of the vehicle 202. The access control device 104 is located on the dashboard of the vehicle 202 to which it has been preprogrammed. The vehicle 202 is located in a fleet management environment, such as, but not limited to, a car rental lot or car dealership lot, and parked and locked, awaiting a user 204 to access the vehicle 202. As a user 204 bearing an authorized access device 108 approaches the vehicle 202, the access device 108 is authenticated by the access control device 104. When the access control device 104 is an RFID card reader, the access control device 104 detects an approaching RFID card access device 108 within the range 102. In this particular embodiment, it is not necessary for the access device 108 to actually touch or slide through the access control device 104 since the user 204 need only be present within the range 102. The access control device 104 reviews the access device 108 of the approaching user 204 and verifies whether the user 204 is allowed to gain entry to the vehicle 202. If the user 204 is authenticated with a valid access device 108, the access control device 104 informs the access chip module 106 to activate the on-board keyless entry system of the vehicle 202 and unlock the vehicle 202. If there has been a period of inactivity for a predetermined amount of time and the vehicle 202 is unlocked, the access control device 104 will inform the access chip module 106 to activate the on-board keyless entry system of the vehicle 202 and lock the vehicle 202. Alternately, the access control device 104 allows for the locking of the specific vehicle 202 by means of the access device 108.

Figure 3:
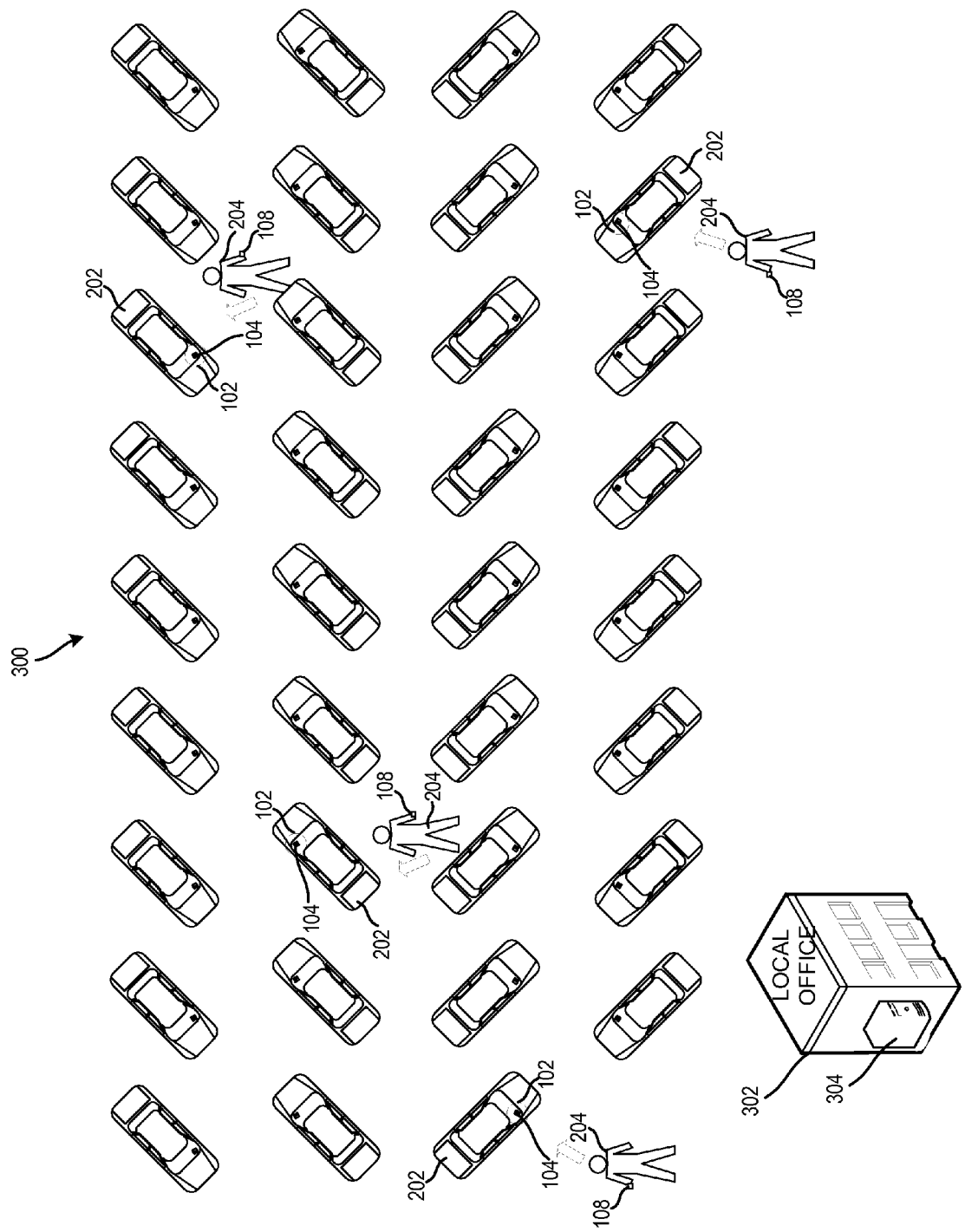
FIG. 3 is a schematic diagram illustrating a plurality of users each bearing a unique, preprogrammed portable access device for use in a fleet vehicle management environment with the plurality of vehicles each having an access control device located within, according to an embodiment of this technology.

Referring now to FIG. 3, a schematic diagram 300 is shown, illustrating a plurality of users 204, each bearing a unique, preprogrammed portable access device 108 for use in a fleet vehicle management environment. In a fleet vehicle management environment, such as the parking lot of a rental car company or an automobile dealership, a plurality of vehicles 202 are parked in the parking lot with an access control device 104 located within or on each vehicle 202. As a user 204 departs the local office 302 of the car dealership or rental car company, the user 204 approaches the locked destination vehicle 202. When the access control device 108 is an RFID card reader, the access control device 104 detects an approaching RFID card access device 108 within the range 102. The access control device 104 reviews the access device 108 of the approaching user 204 and verifies whether the user 204 is allowed to gain entry to the vehicle. If the user 204 is authenticated with a valid access device 108, the access control device 104 informs the access chip module 106 to activate the on-board keyless entry system of the vehicle 202 and unlock the vehicle 202.

Located within the local office 302, or similar location, is an access device configuration system configured to program and personalize each access device 108 carried by the user 204 desiring access to the particular locked vehicle 202 in the fleet vehicle management environment. The system further includes a localized server 304 and related software encoded with programming for configuring the access device 108. The software is configured to assign the access device 108 for the user 204 and to authorize the usage of the access device 108. The access device 108 is reactivated each day in order to prevent unauthorized use of a lost or stolen access device 108. A master access device configured to provide access to all vehicles in the vehicle fleet management environment is maintained by authorized personnel in the local office 302 of the car dealership or rental car company.

Figure 4:
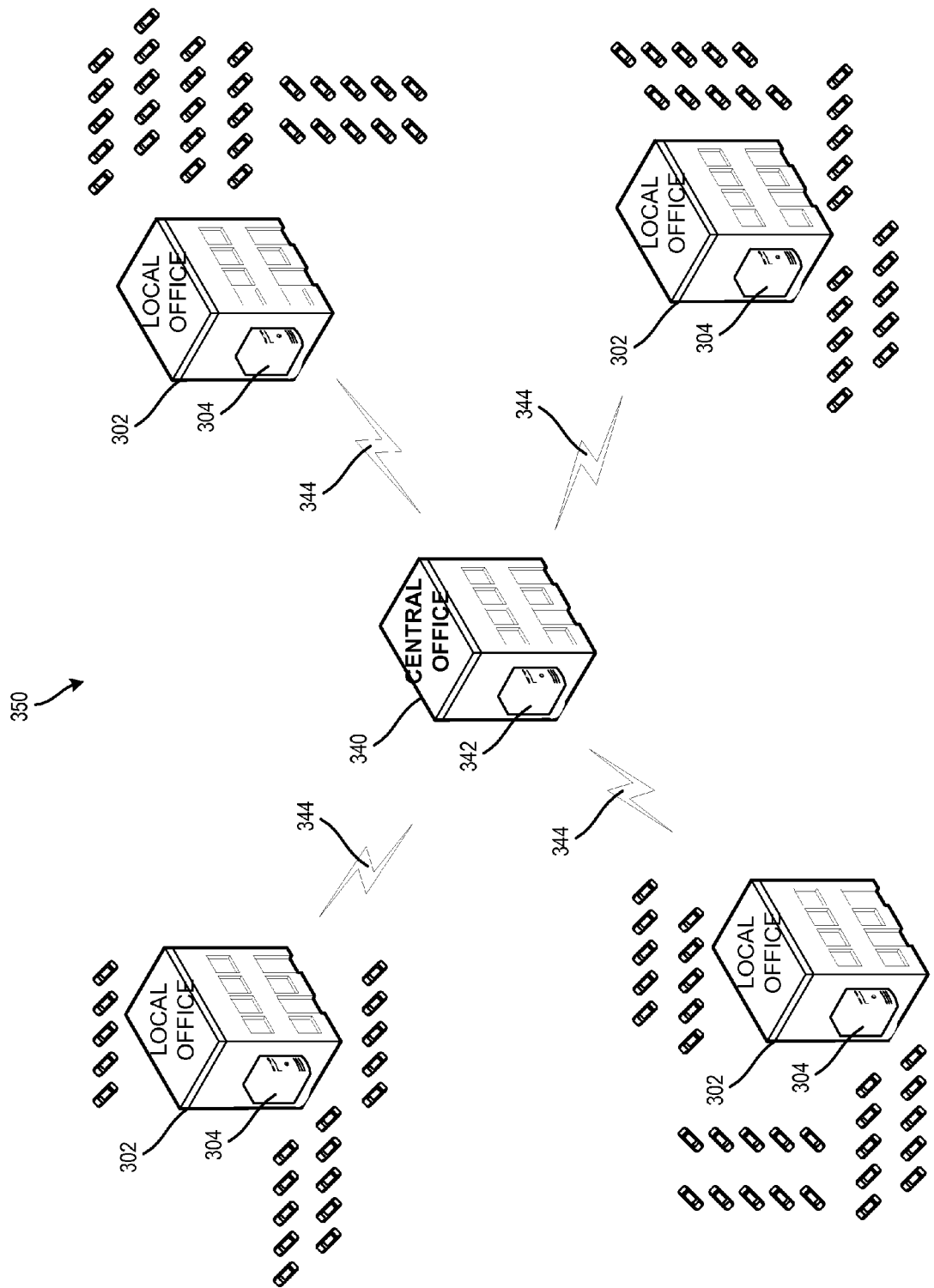
FIG. 4 is a schematic diagram illustrating a plurality of local servers in communication with a central server via the internet or a satellite network.

In one alternative embodiment, the office 302 has located within it a localized server 304 used as a data collection point for the access control devices 104 used in the parking lots serviced by that office 302. The localized server 304 provides data on user access and vehicle access. As vehicles 202 are accessed by various users 204, collection data is maintained in the office 302. Optionally, as illustrated in FIG. 4 in the centralized server schematic 350, the localized server 304 communicates with a central server 342 at a central office 340 that is not located on the premises via the internet or a satellite network 344 in order to aggregate the data of several localized servers 304. The localized server 304 operates software encoded with programming configured to monitor activity communications, thereby providing an audit trail for fleet vehicle inventory and user access activities by a localized server 304. The localized server 304 operates software encoded with programming configured to provide for routine functionality checks of each access control device 104 by a localized server 304. The localized server 304 is further configured to wirelessly override an access control device 104 and lock/unlock the vehicle without the access device 108 being presented to the vehicle 202. Alternately, the access control device 104 allows for the locking of the specific vehicle 202 by means of the access device 108. Alternately, the local server 304 could remotely issue a command to a specific access control device 104 to secure the vehicle 202. The localized server 304 is further configured to receive alerts from any access control device 104 that detects an unauthorized entry, thus providing a security monitoring service. The localized server 304 is further configured to receive vehicle location information from any access control device 104, thereby providing the location of a vehicle with a large fleet of vehicles or providing the location of a misplaced or unused access control device.

The localized server 304 need not be located at the on-site office 302 so long as wireline or wireless connectivity is maintained between the access control devices 108 and the localized sever 304. A wireless communications transmitter and receiver is located with and electronically coupled to the localized server for vehicle fleet management. Additionally, a wireless communications transmitter and receiver is located with and electronically coupled to the access control device 104. The wireless communications capability includes, for example, Satellite, WiFi, WiMax, cellular phone, and the like technologies.

Figure 5:
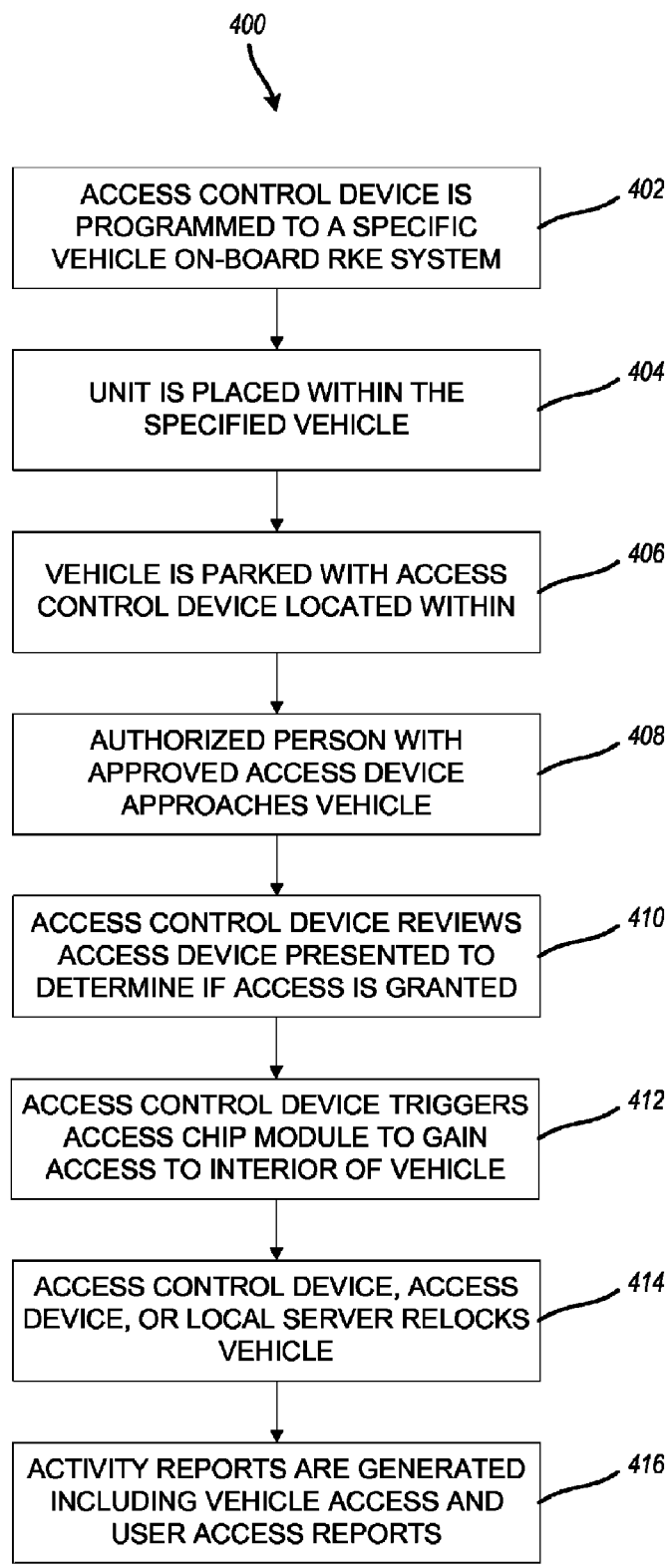
FIG. 5 is a flowchart diagram illustrating a method by which an access control device is programmed, configured, and utilized in a fleet vehicle, according to an embodiment of this technology.

Referring now to FIG. 5, a flowchart diagram 400 is shown, illustrating a method by which an access control device 104 is programmed, configured, and utilized in a fleet vehicle 202. Secure keyless entry is provided to the user 204 for the vehicle 202 in the fleet vehicle management environment without the user 204 having possession of a vehicle key or a vehicle key fob to gain entry to the vehicle 202. The method includes, in step 402, configuring an access control device 104 to correspond to an on-board keyless entry system 100 in a specific vehicle 202 in a fleet vehicle management environment such as a car dealership, car rental company, or the like. The method includes, in step 404, placing the configured access control device 104 with the specific vehicle 202.

The method includes, in step 406, parking the vehicle in the fleet vehicle management environment with the configured access control device 104 located within or on the vehicle 202. For example, the access control device 104 is located on the dashboard of the vehicle 202. Alternatively, the access control device 104 is, for example, located on the driver side window such that part of the access control device 104 is outside of the vehicle 202 and accessible, for example, by a card to be swiped in a card swipe reader.

The method includes, in step 408, approaching the specific vehicle 202 with an access device 108 presumably for the specific vehicle. The access device 108 is a RFID card, keypad entry sequence, swipe card, or the like.

The method includes, in steps 410 and 412, authenticating, by the access control device 104, whether a bearer of the approaching access device 108 is, in fact, authorized to gain entry into the specific vehicle 202, and triggering an access chip module 106, by the access control device 104, to activate the on-board keyless entry system receptors in the specific vehicle 202 and unlock the vehicle 202.

The method includes, in step 414, relocking the vehicle after a predetermined period of time due to access inactivity. For example, after an inactivity period of ten minutes surrounding an unlocked vehicle 202, the access control device 104 relocks the vehicle 202. Alternately, the access control device 104 allows for the locking of the specific vehicle by means of the access device 108. Alternately, the local server 304 could remotely issue a command to a specific access control device 104 to secure the vehicle 202. The method further includes, in step 416, generating activity reports for user access and vehicle inventory access. Thus additionally provides an audit trail for later use.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A remote, electronic keyless entry system for fleet vehicle management, the system comprising:
    an access device, wherein the access device is a personalized, programmable access device carried by a user desiring access to a particular locked vehicle in a fleet vehicle management environment;
    an access control device, wherein the access control device is located on an automobile vehicle and is configured to access wirelessly an on-board vehicle keyless entry system, wherein the access control device is not permanently assigned to one vehicle, and wherein the access control device is not physically attached and anchored to the vehicle and is further configured for multiple reuses in multiple vehicles, wherein the access control device is constructed of a polymer material that is water, chemical, and extreme temperature resistant; and
    an access chip module, wherein the access chip module is electronically attached to the access control device and is configured to activate the on-board vehicle keyless entry system and thereby unlock the particular locked vehicle; and
    a common power source configured to provide durable power to the access control device and the access chip module;
    wherein secure keyless entry is provided to the user for a vehicle in the fleet vehicle management environment without the user having possession of a vehicle key or a vehicle key fob to gain entry to the vehicle;
    wherein the access control device comprises a radio-frequency identification (RFID) card reader and a microprocessor and the access device comprises a radio-frequency identification (RFID) tag encased in a polymer material.

2. The remote, electronic keyless entry system for fleet vehicle management of claim 1, wherein the access control device is a keypad configured to receive a keypad sequence entered into the keypad.

3. The remote, electronic keyless entry system for fleet vehicle management of claim 1, wherein the access control device is a magnetic card swipe reader device and the access device is a magnetically encoded card.

4. The remote, electronic keyless entry system for fleet vehicle management of claim 1, wherein the access chip module is a remote keyless entry (RKE) integrated circuit (IC) access chip.

5. The remote, electronic keyless entry system for fleet vehicle management of claim 1, further comprising:
    an access device configuration system configured to program and personalize the access device carried by the user desiring access to the particular locked vehicle in a fleet vehicle management environment;
    a computer readable medium encoded with programming for configuring the access device, the programming configured to assign the access device for the user and to authorize the usage of the access device.

6. The remote, electronic keyless entry system for fleet vehicle management of claim 1, further comprising:
    access device time limits, wherein the access device is limited in use to within the boundaries of an adjustable, preset timed automatic relocking time period.

7. The remote, electronic keyless entry system for fleet vehicle management of claim 1, wherein the access control device and the access device are both customized for a specific fleet vehicle management environment.

8. The remote, electronic keyless entry system for fleet vehicle management of claim 1, further comprising:
    a master access device configured to provide access to all vehicles in the vehicle fleet management environment.

9. The remote, electronic keyless entry system for fleet vehicle management of claim 1, wherein the access device is reactivated each day in order to prevent unauthorized use of a lost or stolen access device.

10. The remote, electronic keyless entry system for fleet vehicle management of claim 1, further comprising:
    an operational self test indicator, wherein the operational self test indicator provides an audio and/or visual indication that the keyless entry electronics are activated.

11. The remote, electronic keyless entry system for fleet vehicle management of claim 1, wherein the access control device is reconfigurable for use in another vehicle.

12. The remote, electronic keyless entry system for fleet vehicle management of claim 1, further comprising:
    a localized server, the localized server configured to assign and reassign an access device and to calculate and prepare user access and vehicle access reporting.

13. The remote, electronic keyless entry system for fleet vehicle management of claim 1, further comprising:
    a wireless communications transmitter and receiver located with and electronically coupled to the access control device; and
    a wireless communications transmitter and receiver located with and electronically coupled to a localized server for vehicle fleet management.

14. The remote, electronic keyless entry system for fleet vehicle management of claim 1, further comprising:
    a computer readable medium encoded with programming configured to monitor activity communications, thereby providing an audit trail for fleet vehicle inventory and user access activities by a localized server.

15. The remote, electronic keyless entry system for fleet vehicle management of claim 1, further comprising:
    a computer readable medium encoded with programming configured to provide for routine functionality checks of each access control device by a localized server.

16. The remote, electronic keyless entry system for fleet vehicle management of claim 1, further comprising:
    a localized server configured to wirelessly override an access control device and lock/unlock the vehicle without the access device being presented to the vehicle.

17. The remote, electronic keyless entry system for fleet vehicle management of claim 1, wherein the access control device is further configured to detect an unauthorized access to a vehicle and subsequently and wirelessly communicate the detection to a localized server configured to electronically alert personnel.

18. The remote, electronic keyless entry system for fleet vehicle management of claim 1, wherein the access control device is further configured to facilitate vehicle location;

wherein a vehicle location device provides the location of the access control unit to a central server, thereby providing the location of a vehicle with a large fleet of vehicles or providing the location of a misplaced or unused access control device.

19. The remote, electronic keyless entry system for fleet vehicle management of claim 1, further comprising:
an engine interrupt system, wherein the engine interrupt system is electronically coupled to the access control device and the engine interrupt system will disable the engine from starting when no authorized access device is presented to the access control device, thereby allowing a vehicle ignition key to be left in the ignition or within a local office.

20. A method for the remote, electronic keyless entry in fleet vehicle management, the method comprising:
configuring an access control device to wirelessly correspond to an on-board keyless entry system in a specific vehicle in a fleet vehicle management environment, wherein the access control device is not permanently assigned to one vehicle, and wherein the access control device is not physically attached and anchored to the vehicle and is further configured for multiple reuses in multiple vehicles, wherein the access control device is constructed of a polymer material that is water, chemical, and extreme temperature resistant, wherein the access control device comprises a radio-frequency identification (RFID) card reader and a microprocessor and the access device comprises a radio-frequency identification (RFID) tag encased in a polymer material;
placing the configured access control device with the specific vehicle;
parking the vehicle in the fleet vehicle management environment with the configured access control device located on the vehicle;
approaching the specific vehicle with an access device for the specific vehicle;
authenticating, by the access control device, whether a bearer of the approaching access device is, in fact, authorized to gain entry into the specific vehicle;
triggering an access chip module, by the access control device, to activate the on-board keyless entry system receptors in the specific vehicle and unlock the vehicle; and
relocking automatically the vehicle after a predetermined period of time due to access inactivity, relocking the vehicle by using the access device, or relocking the vehicle with a command from a local server; and
utilizing a common power source configured to provide durable power to the access control device and the access chip module;
wherein secure keyless entry is provided to the user for the vehicle in the fleet vehicle management environment without the user having possession of a vehicle key or a vehicle key fob to gain entry to the vehicle.

21. The method for the remote, electronic keyless entry in fleet vehicle management of claim 20, further comprising:
generating activity reports for user access and vehicle access.

22. The method for the remote, electronic keyless entry in fleet vehicle management of claim 20, wherein the access device is a personalized, programmable access device carried by a user desiring access to a particular locked vehicle in a fleet vehicle management environment.

23. The method for the remote, electronic keyless entry in fleet vehicle management of claim 20, wherein the access control device is located within an automobile vehicle and is configured to access electronically and wirelessly an on-board vehicle keyless entry system.

24. The method for the remote, electronic keyless entry in fleet vehicle management of claim 20, wherein the access chip module is electronically attached to the access control device and is configured to activate a particular on-board vehicle keyless entry system and thereby unlock the particular locked vehicle.

25. The method for the remote, electronic keyless entry in fleet vehicle management of claim 20, wherein the access control device is a keypad configured to receive a keypad sequence entered into the keypad.

26. The method for the remote, electronic keyless entry in fleet vehicle management of claim 20, wherein the access control device is a magnetic card swipe reader device and the access device is a magnetically encoded card.

27. The method for the remote, electronic keyless entry in fleet vehicle management of claim 20, wherein the access chip module is a remote keyless entry (RKE) integrated circuit (IC) access chip.

* * * * *